(12) United States Patent
Nakane

(10) Patent No.: US 6,528,921 B1
(45) Date of Patent: Mar. 4, 2003

(54) POWER TOOLS HAVING SEPARABLE BRUSH HOLDER SEGMENTS

(75) Inventor: Shinichi Nakane, Anjo (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 09/711,887

(22) Filed: Nov. 15, 2000

(30) Foreign Application Priority Data

Nov. 19, 1999 (JP) ............................................. 11-330276

(51) Int. Cl.[7] .......................... H02K 7/04; H02K 13/00; H02K 1/12; H01R 39/38; H01R 39/52

(52) U.S. Cl. ...................... 310/239; 310/238; 310/235; 310/242; 310/248; 310/249; 310/254; 310/50

(58) Field of Search ................................ 310/239, 233, 310/235, 242, 248, 249, 234, 246, 50

(56) References Cited

U.S. PATENT DOCUMENTS

| 3,911,304 A | * | 10/1975 | Seely | 310/242 |
|---|---|---|---|---|
| 4,246,508 A | * | 1/1981 | Zimmer | 310/242 |
| 4,569,128 A |  | 2/1986 | Antl et al. | 29/596 |
| 4,800,312 A | * | 1/1989 | Wacek et al. | 310/239 |
| 4,908,538 A | * | 3/1990 | Geberth, Jr. | 310/59 |
| 5,047,679 A | * | 9/1991 | Baader et al. | 310/89 |
| 5,055,728 A | * | 10/1991 | Looper et al. | 310/91 |
| 5,277,261 A |  | 1/1994 | Sakoh | 173/176 |
| 5,642,008 A | * | 6/1997 | McCracken | 310/50 |
| 5,648,695 A | * | 7/1997 | Yamaguchi et al. | 310/239 |
| 5,717,271 A | * | 2/1998 | Aoki et al. | 310/239 |
| 5,872,414 A | * | 2/1999 | Iijima | 310/89 |
| 6,124,567 A | * | 9/2000 | Feldhausen et al. | 219/130.1 |
| 6,133,665 A | * | 10/2000 | Prell et al. | 310/239 |

FOREIGN PATENT DOCUMENTS

| DE | 3444143 |  | 6/1986 |
| DE | 4129720 |  | 3/1993 |
| JP | 09272075 |  | 10/1997 |
| JP | 409272075 A | * | 10/1997 |

* cited by examiner

*Primary Examiner*—Nestor Ramirez
*Assistant Examiner*—Julio C. Gonzalez
(74) *Attorney, Agent, or Firm*—Dennison, Schultz & Dougherty (57) ABSTRACT

A power tool has a motor housing that comprises housing halves arranged in the circumferential direction of a motor. A brush holder is disposed within the motor housing and serves to support brushes. The brush holder comprises holder halves that are arranged in the circumferential direction of the motor. In order to assemble the brush holder into the housing, one of the holder halves is set onto one of the housing halves. Thereafter, the rotor and the stator are set onto the one of the housing halves. Then, the other holder half is set onto the one of the holder halves and is joined thereto so as to form the brush holder. Finally, the other housing half is set onto the one of the housing halves and are joined thereto so as to form the motor housing.

17 Claims, 5 Drawing Sheets

Pages
POWER TOOLS HAVING SEPARABLE BRUSH HOLDER SEGMENTS

BACKGROUND OF THE INVENTION

1. Field of the Invention

The present invention relates to power tools, and in particular to power tools such as hammer drills and impact drivers that have electric motors as drive sources.

2. Description of the Related Art

Known portable power tools typically have a motor accommodated within a housing and the motor generally includes a rotor, a stator and brushes. The rotor has a rotor shaft that is rotatably supported within the housing by means of bearings. The rotor includes an armature coil mounted on the rotor shaft. A commutator also is mounted on the rotor shaft on one side of the armature coil along the axial direction and is electrically connected to the armature coil. The stator is secured to the inner wall of the housing and may have a field coil that opposes the armature in the radial direction. The brushes are mounted on the inner wall of the housing by means of a brush holder and contact the commutator in the radial direction. The brushes are connected to a power source via a switch so as to supply electric current to the armature coil via the commutator. Such construction of the motor and the principle of rotation of the rotor are well known in the art; therefore, further explanation is not necessary. The rotation of the rotor shaft is transmitted to a spindle via a reduction gear mechanism. A drill bit, a socket, etc. can be mounted on the front end of the spindle.

The housing of known portable power tools is comprised of two housing halves that can be joined to each other to form the housing. This construction is advantageous to permit the motor and various parts to be inserted and assembled into the housing.

On the other hand, the brush holder is an integral member that has a substantially annular configuration so as to surround the commutator. The brushes are mounted on the brush holder in positions diametrically opposite of each other by means of brush supports, so that the brushes can electrically contact the commutator.

However, in the known power tools, because the brush holder is an integral member, it is not possible to assemble the rotor and the stator into the housing after the brush holder has been mounted within the housing. Moreover, it is not possible to assemble the brush holder into the housing after the rotor and the stator has been assembled into the housing.

Therefore, the rotor, the stator, and the brush holder of the known power tools must be assembled into the housing at one time, together with the associated reduction gear mechanism and other part. This assembling operation is very troublesome and time consuming, because the rotor must be inserted into the brush holder and must be held in this position prior to being set into the housing.

SUMMARY OF THE INVENTION

It is, accordingly, one object of the present invention to teach improved power tools, in which a rotor, a stator and a brush holder can be easily and rapidly assembled into a housing.

According to one aspect of the present teachings, power tools are taught that include a power tool housing comprising a plurality of housing segments arranged in the circumferential direction of a motor. The motor may preferably include a rotor, a stator and brushes. A brush holder may be disposed within the power tool housing, which brush holder is adapted to support the brushes. Preferably, the brush holder comprises a plurality of holder segments that are arranged in the circumferential direction of the motor.

Therefore, in order to assemble the motor into the housing, a first holder segment may be set into a first housing segment. The rotor and stator may be then set onto the first housing segment. Thereafter, a second holder segment may be joined to the first holder segment so as to form the brush holder that surrounds the rotor. Finally, a second housing segment may be joined to the first housing segment in order to form the power tool housing. Although two housing segments and two holder segments have been described, in fact, three or more housing segments and holder segments may be utilized with the present teachings.

Thus, the assembling operation of the rotor and the stator into the housing can be performed separately from the assembling operation of the brush holder. As a result, the assembling operation of the motor parts can be easily and efficiently performed.

According to another aspect of the present teachings, representative methods for assembling a motor into a power tool housing are also taught. As noted above, the power tool may comprise at least first and second housing segments, at least first and second holder segments and a motor having a rotor, a stator, and brushes. In this case, the first holder segment may be first set into the first housing segment. Preferably, the first housing segment is adapted to be joined the second housing segment in a circumferential direction with respect to the motor and thereby form the power tool housing. Moreover, the first holder segment preferably is adapted to be joined to the second housing segment in the circumferential direction of the motor and thereby form a brush holder that is adapted to hold the brushes.

Then, the rotor and the stator may be set into the first housing segment. The first holder segment may then be set into the second holder segment. At this time, the first and second holder segments may be fixedly attached. Thereafter, the second housing segment may be set onto the first housing segment and the first and second housing segments may be fixedly attached. Naturally, other methods for assembling the above-described housing segments, holder segments and motor may be utilized with the present teachings.

As noted above, the assembling operation of the rotor and the stator into the housing can be performed separately from the assembling operation of the brush holder. As a result, the assembling operation of the motor parts can be easily and efficiently performed.

These teachings may be used together or separately to make power tools of the present teachings. In addition, other objects, features and advantages of the present invention will be readily understood after reading the following detailed description together with the accompanying drawings and the claims.

DETAILED DESCRIPTION OF THE INVENTION

Power tools are taught having a power tool housing for accommodating, among other things, a motor. The motor may preferably include a rotor, a stator and brushes that serve to supply electric power to the rotor via a commutator. The motor housing may comprise a plurality of housing segments that are arranged in the circumferential direction of the motor. A brush holder may be disposed within the motor housing so as to support the brushes and may comprise a plurality of holder segments that are arranged in the circumferential direction of the motor. The circumferential direction of the motor may also be the circumferential direction of the rotor.

Preferably, the number of the holder segments is the same as the number of the housing segments. More preferably, two housing segments and two holder segments are provided and each of the holder segments has a brush support member.

Preferably, both the holder segments have the same configuration and extend over an angular range that is the same as the angular range of the corresponding housing segment that opposes thereto in the radial direction of the rotor. More preferably, each of the housing segments and each of the holder segments extend over an angular range of about 180° in the circumferential direction. The holder segments may be adapted to be positioned in a point symmetrical manner with each other with respect to the rotational axis of the rotor in the assembled state into the motor housing.

Each of the housing segments and each of the holder segments may have opposite ends in the circumferential direction. The housing segments may be adapted to be joined to each other at their opposite ends, so that the joined opposite ends of the housing segments are disposed within a first joining plane. The holder segments may be adapted to be joined to each other at their opposite ends, so that the joined opposite ends of the holder segments are disposed within a second joining plane. The first joining plane and the second joining plane may extend within substantially the same plane when the brush holder has been assembled into the motor housing.

In another aspect of the present teachings, each of the holder segments may include a means for guiding an electric line or wire along a predetermined path that extends from the corresponding brush to a power source. The guide means may be, for example, a set of appropriately positioned protrusions.

The rotor may have a rotor shaft and the commutator and an armature coil may be mounted on the rotor shaft. Each of the holder segments may have a front surface that opposes the armature coil in the axial direction of the rotor shaft. The guide means may serve to guide the electric line from the corresponding brush in a direction radially and outwardly with respect to the rotor shaft along the front surface of the corresponding holder segment.

Preferably, the guide means includes a plurality of projections that extend forwardly from the front surface of each holder segment so as to form a guide path for the electric line between the plurality of projections.

The rotor may further include a fan mounted on the rotor shaft on the rear side of the armature coil. The motor housing may include a buffer plate that is disposed on the rear side of the fan. The buffer plate may be adapted to control the flow of air produced by the fan within the power tool housing. Each of the projections may have a front end that is adapted to contact the buffer plate, so that the electric line extends through and between the corresponding holder segment and the buffer plate and along the projections.

In another aspect of the present teachings, methods for assembling the motor into the power tool housing are taught. The motor may include a rotor, a stator, and brushes for supplying electric power to the rotor via a commutator. A representative detailed method may, for example, include:

(a) preparing a plurality of motor housing segments, the housing segments being adapted to be joined to each other in a circumferential direction of the motor so as to form the power tool housing surrounding the motor;

(b) preparing a plurality of brush holder segments, the holder segments being adapted to be joined to each other in the circumferential direction of the motor so as to form a brush holder for holding brushes;

(c) setting one of the holder segments onto one of the housing segments;

(d) setting the rotor and the stator onto the one of the housing segments;

(e) setting the other holder segments onto the one of the holder segments and joining the holder segments to each other so as to form the brush holder; and (f) setting the other housing segments onto the one of the housing segments and joining the housing segments to each other so as to form the motor housing.

Preferably, the method further includes the step of mounting bearings on the rotor prior to step d). Further, the rotor may be set in step d) by setting the bearings into the one of the housing segments.

Preferably, step f) further includes the step of fixing the rotor and the stator in a position between the housing segments.

Preferably, each of the housing segments and each of the holder segments have opposite ends in the circumferential direction, and the step e) further includes the step of joining the holder segments to each other at their opposite ends and simultaneously securing the joined holder segments to the one of the housing segments.

Preferably, prior to the step c), the method further includes the step of connecting electric lines to the brushes and wiring each electric line along a predetermined path on the corresponding holder segment.

Each of the additional features and teachings disclosed above and below may be utilized separately or in conjunction with other features and teachings to provide improved power tools and methods for designing, assembling and using such power tools. A representative example of the present invention, which examples utilize many of these additional features and teachings both separately and in conjunction, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe a representative example of the present teachings. Moreover, various features described herein may be combined in ways that are not specifically enumerated in order to provide additional useful embodiments of the present teachings.

Figure 1:
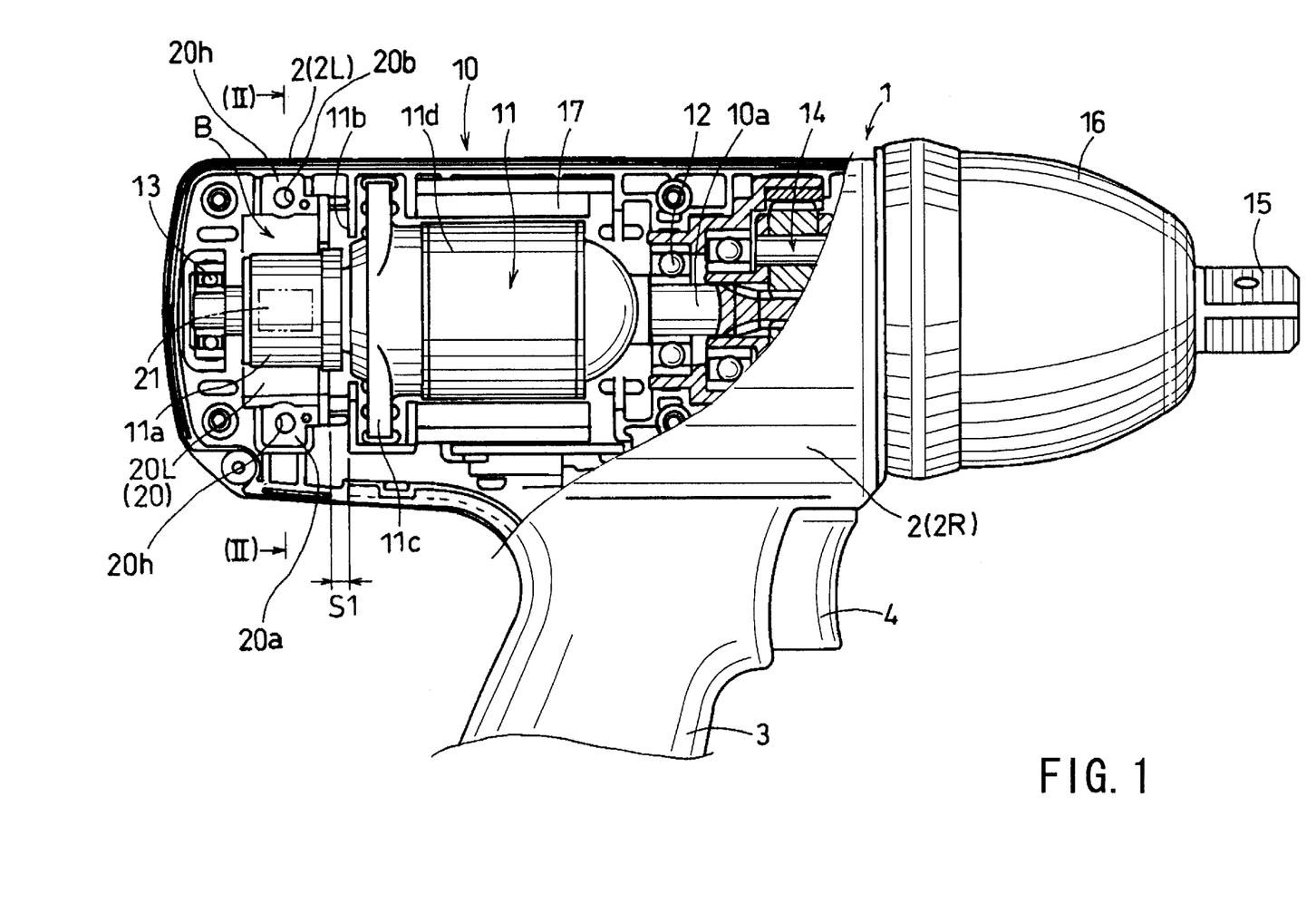
FIG. 1 is a side view of a representative impact driver, in which a rear portion of a motor housing is broken away to show the various parts disposed within the motor housing.
Figure 2:
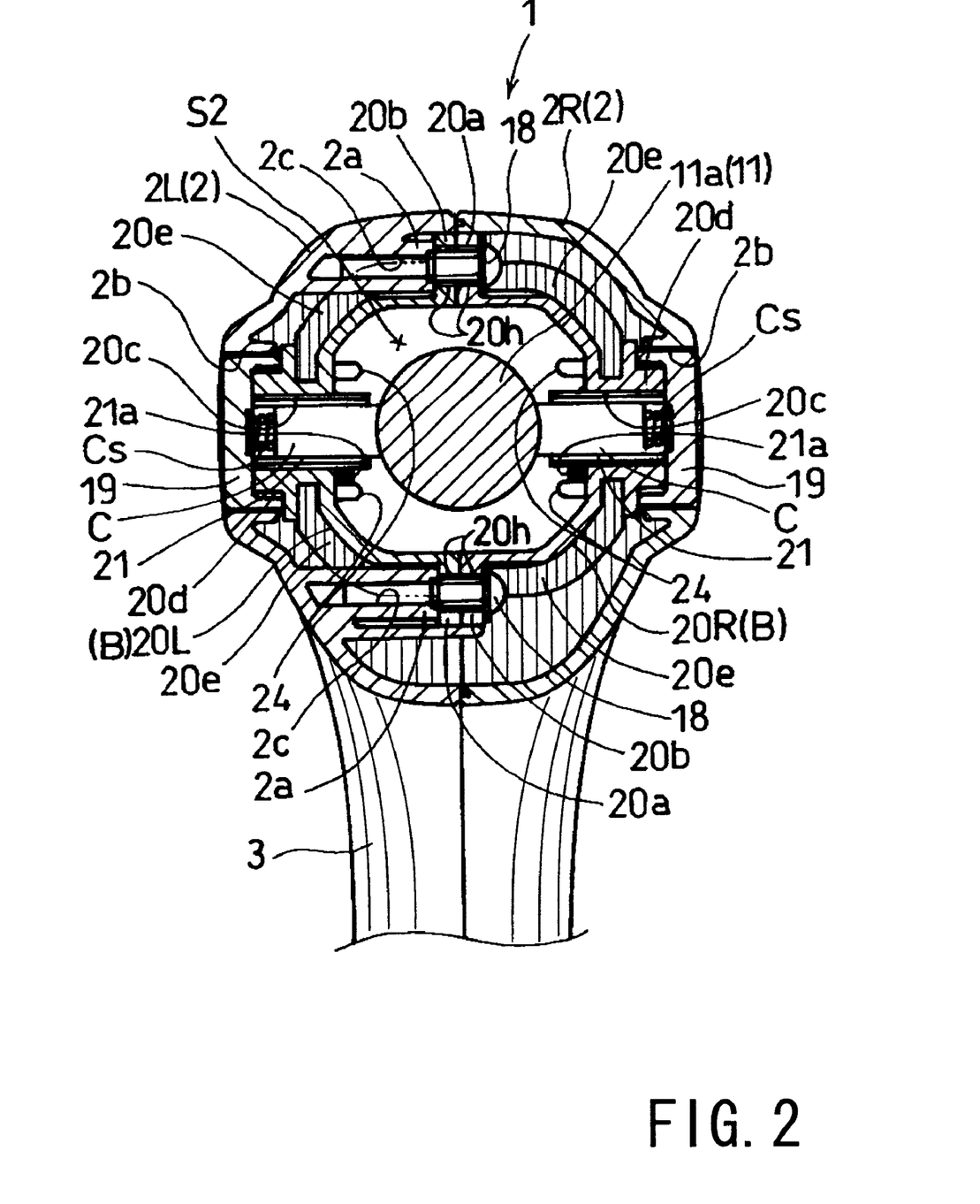
FIG. 2 is a sectional view taken along line II—II in FIG. 1 and showing a sectional view of a brush holder and the other parts associated with the brush holder as viewed from the rear side of the impact driver.

Referring to FIGS. 1 and 2, a representative rotary impact driver 1 is shown that may include a housing 2 and a motor 10 that is accommodated within the housing 2. The motor 10 may include a rotor 11, a stator (or a field coil) 17 and a pair of brushes C that are preferably made of carbon. The rotor 11 may include a rotor shaft 10a, an armature coil 11d and a commutator 11a. The rotor shaft 10a may be rotatably supported within a rear portion (a left portion as viewed in FIG. 1) of the housing 2 by means of bearings 12 and 13. The armature coil 10d may be disposed substantially centrally with respect to the rotor shaft 10a. The commutator 11a may be electrically connected to the armature coil 11d and may be disposed rearward of the armature coil 11d.

The rotation of the rotor 11 can be transmitted to a spindle (not shown) via a planetary gear train 14. The spindle may be rotatably supported within a front portion of the housing 2. The rotation of the spindle may further be transmitted to an anvil 15 via an impact mechanism (not shown) that is disposed within an impact casing 16 that is connected to the front end of the housing 2. The anvil 15 may be disposed on the same axis as the spindle and may be adapted to receive a tool bit, such as a hexagonal socket that can receive bolts or nuts. More specifically, the impact mechanism may include a hammer (not shown) mounted on the spindle with the intervention of bearings (not shown) between the hammer and the spindle, so that the rotation of the spindle can be transmitted to the hammer while the hammer can move in the axial direction relative to the spindle. The hammer may be biased against the anvil 15 in such a direction that the hammer engages the anvil in the rotational direction. As a result, during the initial stage of the driving operation of bolts or nuts, the anvil 15 rotates together with the spindle so as to drive the bolts or nuts into a workpiece (not shown). When the driving resistance applied to the anvil 15 by the bolts or nuts exceeds a predetermined value, an impact force may be periodically applied to the anvil 15 by the hammer in the rotational direction by virtue of the operation of the spring and bearings. As a result, the bolts or nuts can be driven into the workpiece by a larger torque than is possible with a usual power screwdriver. Such an impact mechanism is well known in the art, such as U.S. Pat. No. 5,277,261 (in the name of the same assignee as the present application), the contents of which have been incorporated as a reference.

A handle 3 may be formed integrally with the housing 2 and may extend downward from the housing 2 as viewed in FIG. 1. A trigger 4 may be mounted on the upper front side of the handle 3, so that an operator can start the motor 10 by pulling the tigger 3 using his finger.

As shown in FIG. 2, the housing 2 may comprise a right side housing half 2R and a left side housing half 2L. Thus, the housing 2 is divided into the right and left side housing halves 2L and 2R. In FIG. 1, a substantial portion of the right side housing half 2R is broken away to show the motor 10 and various parts that are disposed adjacent the motor 10. Therefore, FIG. 1 shows only a front portion of the right side housing half 2R.

A brush holder B may serve to support the brushes C and may be mounted on the inner wall of the housing 2 so as to surround the commutator 11a. In the same manner as the housing 2, the brush holder B may comprise a right side holder half 20R and a left side holder half 20L each having a substantially semicircular cross-section. Preferably, the right and left side holder halves 20R and 20L have the same configuration, so that the right side holder half 20R and the left side holder half 20L are interchangeable. Preferably, in the assembled state shown in FIG. 2, the holder halves 20R and 20L are positioned in a point symmetrical manner with respect to the rotational axis of the rotor 11 or the rotor shaft 10a. In addition, the mating or joining surface of the holder halves 20R and 20L may extend within the same plane as the mating or joining surface of the housing halves 2R and 2L.

Flanges 20a and 20b may be formed on both circumferential ends of each of the right and left side holder halves 20R and 20L. An insertion hole 20h may be formed in each of the flanges 20a and 20b for receiving a screw 18.

As shown in FIG. 2, in order to assemble the holder halves 20R and 20L within the brush holder B, the flange 20a of the left side holder half 20L may abut the flange 20b of the right side holder half 20R. Likewise, the flange 20b of the left side holder half 20L may abut the flange 20a of the right side holder half 20R. The brush holder B may then be secured to the left side housing half 2L by inserting screws 18 into the insertion holes 20h of the mating pairs of the flanges 20a and 20b, thereby engaging respective threaded holes 2c formed in support bases 2a. The support bases 2a may be formed integrally with the inner surface of the left side housing half 2L and may extend inwardly of the inner wall. As a result, the brush holder B can be set in a position so as to surround the commutator 11a.

Figure 3:
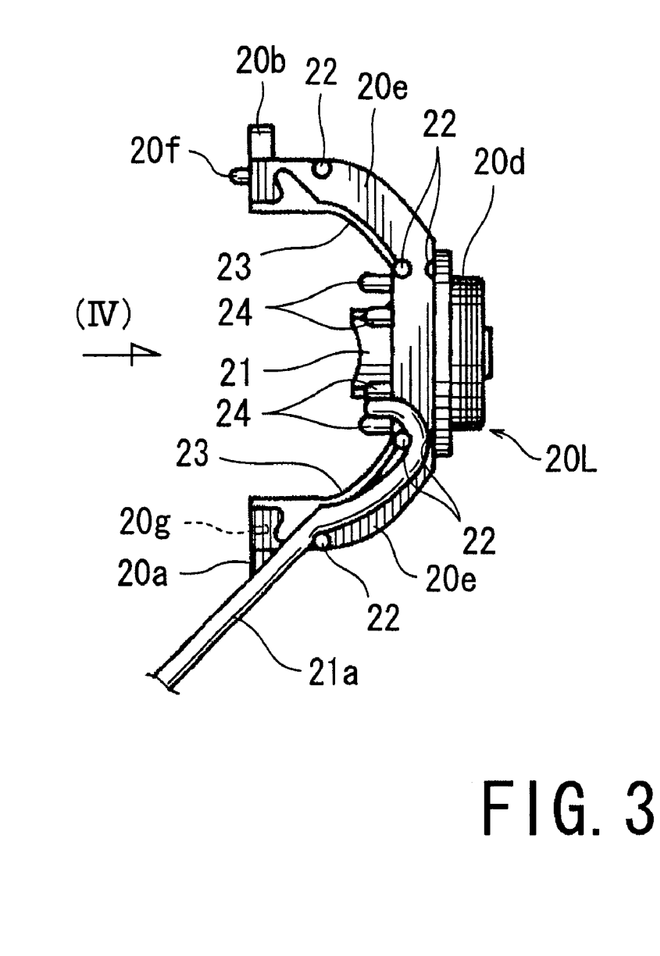
FIG. 3 is a front view of a left side holder half of the brush holder.
Figure 4:
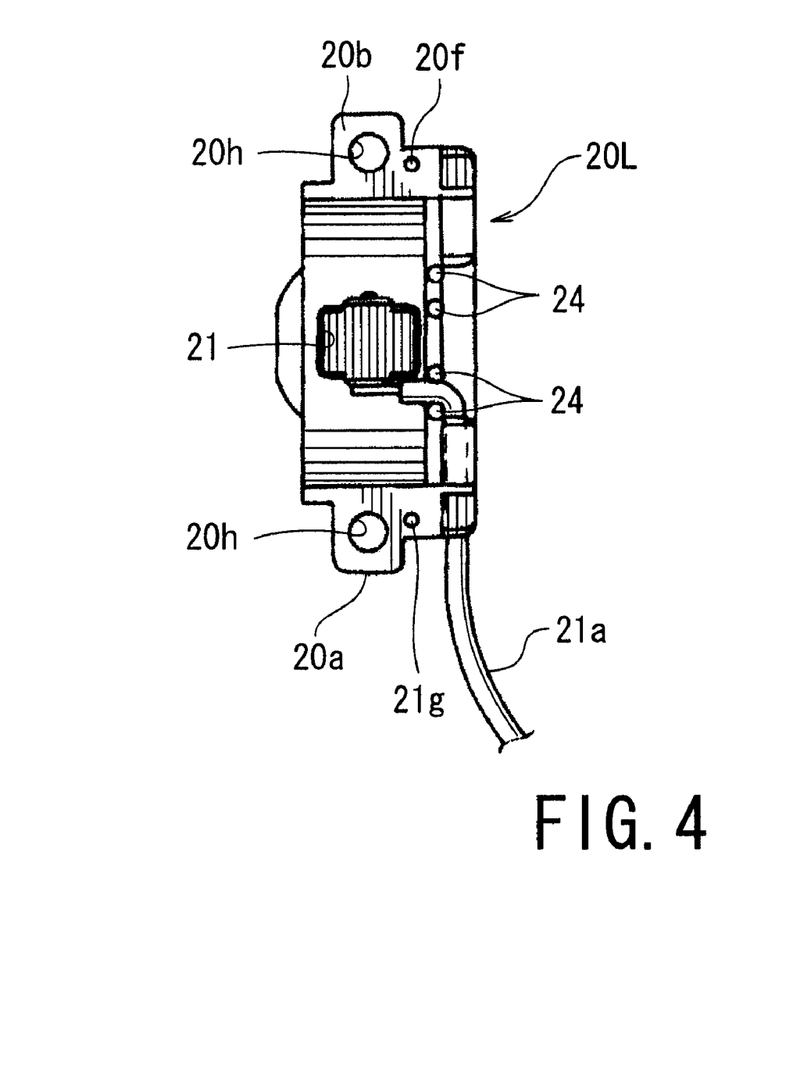
FIG. 4 is a view of the left side holder half as viewed in a direction of an arrow IV in FIG. 3.

Referring to FIGS. 3 and 4, the left side holder half 20R is shown in a front view and a sectional view, respectively. Because the configuration of the right side holder half 20L is the same as the configuration of the left side holder half 20R, views of the right side holder half 20L corresponding to FIGS. 3 and 4 have been omitted. As shown in FIGS. 3 and 4, a protrusion 20f may be formed on an end surface of the flange 20a that opposes the flange 20b. On the other hand, a recess 20g may be formed in an end surface of the flange 20b that opposes the flange 20a, so that the protrusion 20f can engage the recess 20g. Therefore, the right side and left side holder halves 20R and 20L can be fitted together and can be appropriately positioned relative to each other by engaging the protrusions 20f and the recesses 20g with each other, while the flange 20a and the flange 20b of the respective mating pairs abut each other.

In addition, as shown in FIG. 2, which shows the assembled state of the brush holder B, the configuration and the size of the right and left holder halves 20R and 20L are determined such that a substantially cylindrical air channel S2 is formed between the brush holder B and the commutator 11a.

Further, as shown in FIG. 2, a brush mounting hole 20c may be formed in a central portion in the circumferential direction of each of the right side and left side holder halves 20R and 20L. Preferably, in the mounting state shown in FIG. 2, the brush mounting hole 20c extends in the radial direction of the commutator 11a or the rotor 11 and has a substantially square configuration in transverse cross-section. A substantially square prismatic sleeve-like brush support 21 may be fixedly inserted into the brush mounting hole 20c and may removably receive the brush C. The brush support 21 may have an inner part that extends inwardly of the corresponding holder half 20R or 20L toward the commutator 11a, so that one end of an electrical wire 21a can be soldered to the outer surface of the inner part of the brush support 21 adjacent to the corresponding holder half 20R or 20L.

As a result, the brushes C can be positioned on both right and left side of the commutator 11a so as to contact the commutator 11a.

A brush inserting hole 2b may be formed in each of the housing halves 2R and 2L in a position opposing to the brush support 21 or the brush C. The brush inserting hole 2b may be normally closed by a cap screw 19. In this connection, a threaded portion 20d may be formed within an inlet of the brush mounting hole 20c of each of the right side and left side holder halves 20R and 20L. In addition, a compression spring Cs may be disposed between the brush C and the cap screw 19, so that the brush C can be pressed against the commutator 11a to maintain an appropriate electrically conductive contact between the brush C and the commutator 11a. If necessary, the brush C can be removed and can be replaced with a new brush by removing the screw cap 19 from the threaded portion 20d.

As shown in FIG. 2, upper and lower ribs 20e may be formed integrally with the outer surface of each of the holder halves 20R and 20L and may extend between the threaded portion 20d and the flange 20a and between the threaded portion 20d and the flange 20b. More specifically, the ribs 20e protrude radially outward from each of the holder halves 20R and 20L. As shown in FIG. 3, three projections 22 and a guide wall 23 may be formed integrally with a front surface of each of the ribs 20e, so that the projections 22 and the guide wall 23 of one of the ribs 20e are positioned symmetrically with the projections 22 and the guide wall 23 of the other rib 20e with respect to the threaded portion 20d. Two of the projections 22 may be positioned adjacent to the threaded portion 20d, and one of the projections 22 may be separate from the threaded portion 20d. Therefore, a guide path for the electric wire 21a may be formed; so that the electric wire 21a extends from the joint point at the brush support 21 to the outside of the brush holder B via a point between the former two projections 22 and a point between the latter one projection 22 and the guide wall 23. The electric wire 21a may then be connected to a switch circuit (not shown). The switch circuit may be connected to the trigger 4 and may be disposed adjacent to the trigger 4. The switch circuit may then be connected a power source such as an AC power source or a battery (not shown).

In addition, as shown in FIGS. 3 and 4, two pairs of additional projections 24 may be formed on the inner surface of each of the holder halves 20R and 20L and may be disposed adjacent to the upper side and the lower side (as viewed in FIG. 2) of the brush mounting hole 20c, respectively. The additional projections 24 may serve to provide a guide for a portion of the electric wire 21a that protrudes from the brush support 21.

Preferably, as shown in FIG. 4, the length of the projections 22 and the thickness of the guide wall 23 may be slightly greater than the thickness of the electric wire 21a, so that the electric wire 21a does not protrude forwardly beyond the projections 22 and the guide wall 23 that defines the front end of the holder half 20 L or 20L.

Referring to FIG. 1, buffer plate halves 11b (only the buffer plate half 11b of the housing half 2L is shown in FIG. 1) are formed integrally with the housing halves 2R and 2L, respectively. The buffer plate halves 11b may cooperate with each other to form a buffer plate that surrounds a part of the rotor 11 between the armature coil 11d and the commutator 11a in a spaced relationship from the rotor 11. In the assembled state shown in FIG. 1, the holder halves 20R and 20L of the brush holder B may be positioned such that their front ends (that may be defined by the respective projections 22 and the guide walls 23) abut the rear surface of the corresponding buffer plate halves 11b. Thus, the projections 22 and the guide walls 23 serve to provide a space S1 between the ribs 20e and the buffer plate halves 11b. The electric wire 21a may be disposed in space S1.

As described above, the projections 22 and the guide wall 23 are formed on each of the upper and lower ribs 20e, and the pair of additional projections 24 is disposed on each of the upper and lower sides of the brush mounting hole 20c. In addition, the projections 22, the guide wall 23 and the additional projections 24 of the upper side of the holder half 20R or 20L are arranged symmetrically with the corresponding parts disposed on the lower side, respectively. Therefore, the projections 22, the guide wall 23 and the additional projections 24 disposed on either side of the holder half 20R or 20L can be used to provide a guide for the electric wire 21a in response to the position of the holder half 20R and 20L. Thus, the right side holder half 20R and the left side holder half 20L can be used as a left side holder half and a right side holder half, respectively, while providing an appropriate guide for the electric wire 21a to extend downward from the front side of each of the holder halves 20R and 20L toward the switch circuit of the trigger 4.

Therefore, the electric wire 21a can be connected to the switch circuit by the shortest possible wiring length, which is not possible with known power tools, in which the electric wires extend outward from the rear side of a brush holder or require a long wiring length. In addition, known power tools require an additional wiring space on the rear side of the brush holder, which additional wiring space may increase the length of a housing of the power tool, and consequently, the entire length of the power tool.

Referring to FIG. 1, a fan 11c may be mounted on the rotor shaft 10a in a position between the commutator 11a and the armature coil 11d, so that the fan 11c is positioned on the front side of the buffer plate (buffer plate halves 11b) in the assembled state. Therefore, as the rotor 11 rotates, the fan 11c also rotates to provide a flow of air. More specifically, the air may enter the housing 2 via inlet windows (not shown) formed in the rear end of the housing 2. The air may then flow through the air channel S2 formed between the brush holder B and the commutator 11a and through a space formed between the buffer plate (buffer plate halves 11b) and the rotor 11. The air may subsequently enter the fan 11c and may flow out of the housing 2 via outlet windows (not shown) formed in a side wall of the housing 2 that surrounds the fan 11c. Therefore, the commutator 11a and the brush holder B can be cooled by the flow of the air. In this embodiment, the buffer plate may serve to direct the flow of the air centrally toward the rotor 11 so as to effectively cool the commutator 11a and the brush holder B. In addition, in the mounted state, no other substantial air flow path is required between the brush holder B and the inner surface of the housing 2. Therefore, almost all the air that enters the housing 2 can flow through the air channel S2 between the commutator 11a and the brush holder B so as to cool these parts.

A representative method for assembling the motor 10 into the housing 2 will now be described with reference to FIGS. 5 to 7. A representative method may include, for example, the following steps:

(1) Soldering one end of the electric wire 21a to the brush support 21 of each of the right side and left side holder halves 20R and 20L and positioning the electric wire 21a along a path determined by the projections 22, the guide wall 23 and the additional projections 24.

Figure 5:
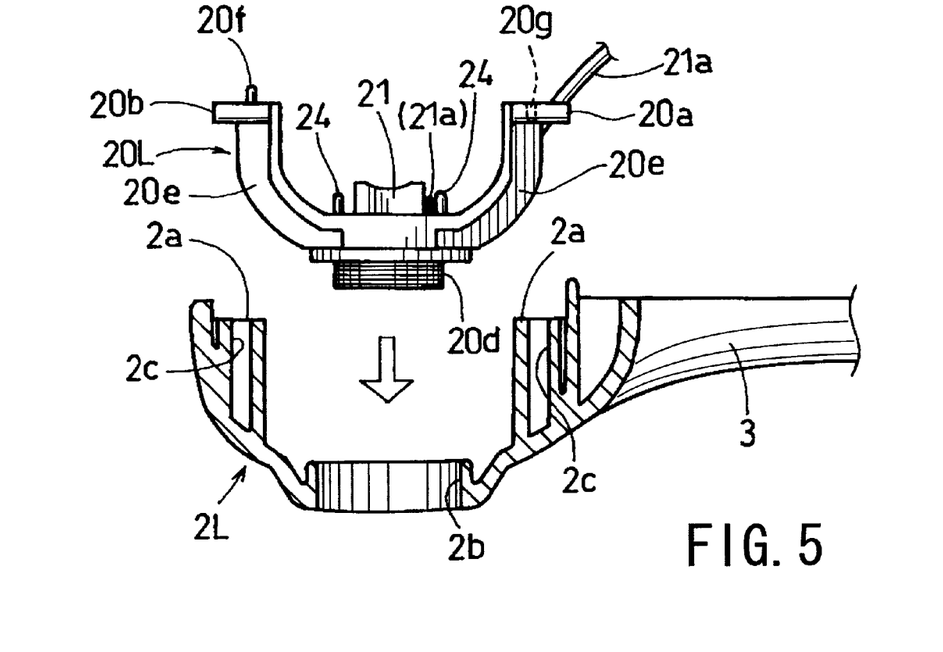
FIG. 5 is an explanatory view showing a representative initial step for assembling the brush holder into the motor housing, in which the left side holder half is positioned to be set into a left side housing half of the motor housing.

(2) Holding the left side housing 2L in position with its open side pointing upwardly, so that the brush insertion hole 2b is oriented substantially in a vertical direction as shown in FIG. 5.

Figure 6:
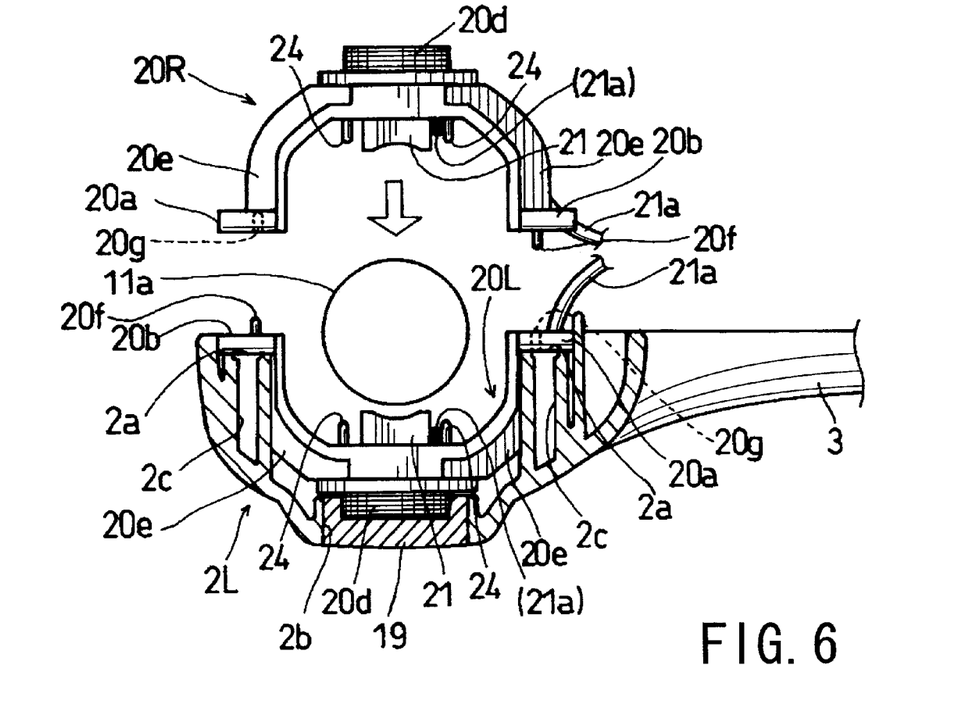
FIG. 6 is an explanatory view showing a representative next step of the assembling process, in which a right side holder half is positioned to be set into the left side holder half.
Figure 7:
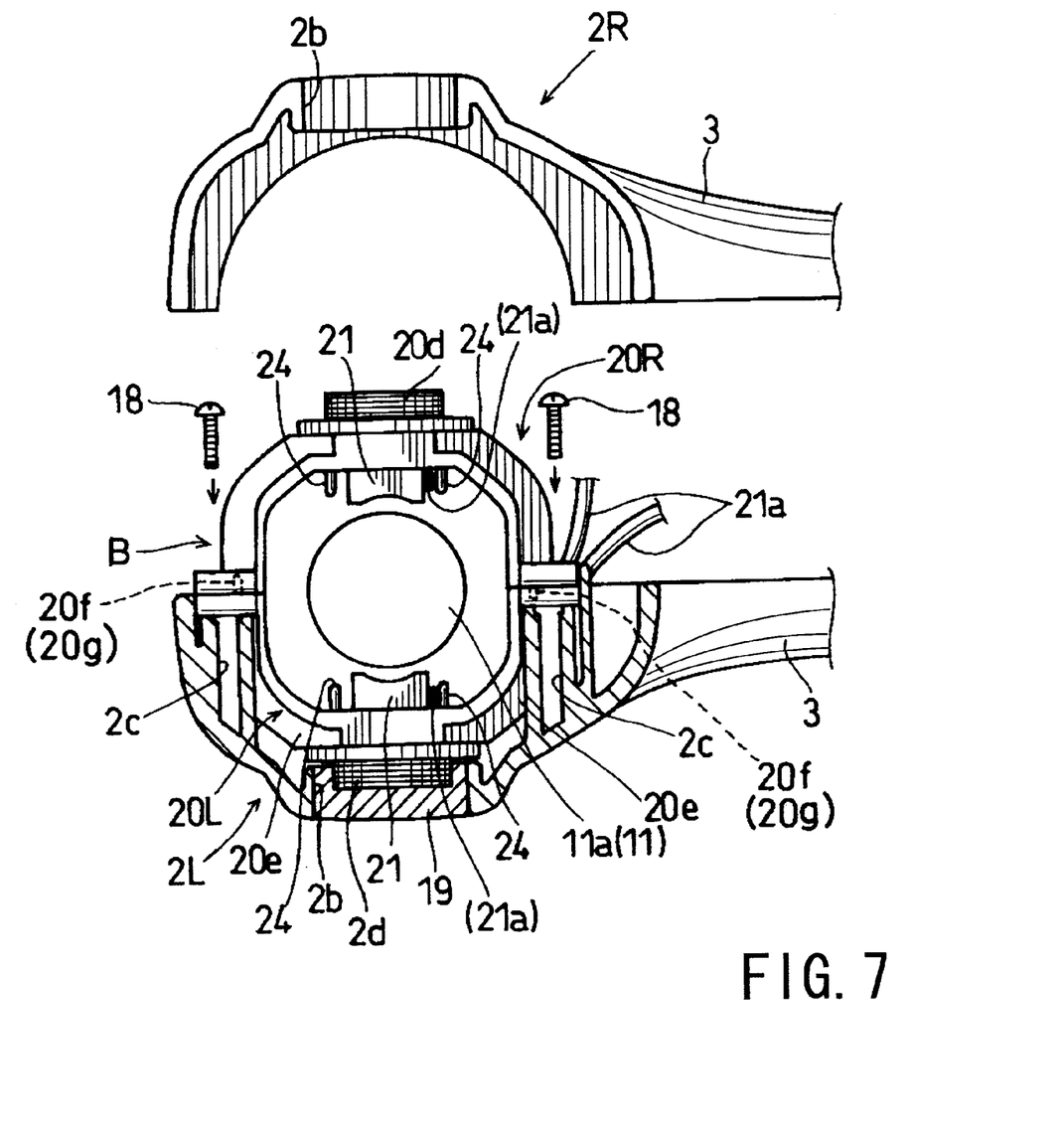
FIG. 7 is an explanatory view showing a representative final step of the assembling process, in which a right side housing half is positioned to be set into the right side housing half after the right side holder half has been set onto the left side holder half.

(3) Setting the left side holder half 20L onto the left side housing half 2L such that the flanges 20a and 20b are placed on the support base 2a of the housing half 2L as shown in FIG. 6. Preferably, the cap screw 19 is engaged with the threaded portion 20d, so that the cap screw 19 may be received by the brush inserting hole 2b to enable precise positioning of the left side holder half 20L on the left side housing 2L. (At this stage, the spring Cs and the brush C have not yet been mounted, and the cap screw 19 may be removed to set the brush C after the assembling operation of the motor 10 has been completed.)

(4) Setting the stator 17 onto the left side housing half 2L.

(5) Mounting the bearings 12 and 13 on both ends of the rotor shaft 10a of the rotor 11.

(6) Inserting the rotor 11 through the stator 17 and mounting the bearings 12 and 13 on the corresponding support portions of the left side housing half 2L.

(7) Setting the bearings 12 and 13 of the rotor 11 onto the left side housing half 2L.

(8) Setting the right side holder half 20R onto the left side holder half 20L so as to surround the commutator 11a. More specifically, the flanges 20a and 20b of the right side holder half 20R are brought into contact with the flanges 20b and 20a of the left side holder half 20R, respectively, while the projections 20f of the flanges 20a engage the corresponding recesses 20g of the flanges 20b as shown in FIG. 7.

(9) Inserting the screws 18 into the insertion holes 20h formed in each of pairs of the flanges 20a and 20b that oppose to each other, and driving the screws 18 into the threaded holes 2c formed in the base 2a of the left side housing half 2L so as to secure the right and left side holders 2R and 2L to the housing half 2L.

(10) Connecting the other end of each of the electric wires 21a to the switch circuit of the trigger 4.

(11) Setting the right side housing half 2R onto the left side housing half 2L so as to cover the rotor 11, the stator 17 and the holder halves 20R and 20L, and subsequently securing the right side housing half 2R to the left side housing half 2L by means of screws (not shown).

While this representative method for assembling the motor 10 into the housing 2 has been provided in detail, naturally, other methods for assembling the motor 10 into the housing 2 are possible and some of the above steps may be interchanged or replaced with different steps.

In order to set the brushes C onto the brush holder B, the cap screw 19 may be disengaged from the threaded portion 20g of the left side holder half 2L. Then, the brush C and the spring Cs may be inserted into the brush support 21 of the holder half 2L. Thereafter, the cap screw 19 may again engage the threaded portion 20g, so that the brush C can be held within the brush support 21 and will be biased against the commutator 11a by the biasing force of the spring Cs. The same process can also be utilized to mount the brush C within the brush support 21 of the right side holder half 2R.

As will be apparent, the left side housing half 2L and the right side housing half 2R in the above representative embodiment of the assembling operation may be replaced with each other. Also, the left side holder half 20L and the right side holder half 20R may be replaced with each other. By preparing the housing segments and holder segments as interchangeable parts, manufacturing costs can be reduced.

Although not described above, parts other than the motor parts, such as the planetary gear train 14, the impact mechanism and the trigger switch 4 of the impact driver 1 may be assembled using known methods before the right side housing half 2R is set onto the left side housing half 2L.

As described above, according to the representative impact driver 1, the brush holder B is divided into two halves 20R and 20L to correspond to the divided housing halves 2R and 2L. Therefore, the rotor 11 and the stator 17 can be easily and rapidly assembled into the housing 2 after one of the right and left side holder halves 20R and 20L has been set onto the corresponding housing half 2R or 2L. Thus, it is not necessary to simultaneously mount the rotor 11 and stator 17 together with the entire brush holder, as is required in known power tools. Instead, the assembling operation of the brush holder B may be completed by securing the other of the right and left side holder halves 20R and 20L to the previously mounted one of them, while the rotor 11 and the stator 17 has already been mounted on one of the housing halves 2R and 2L.

In addition, the brush holder B may be assembled into the housing 2 such that substantially no space is provided for cooling air to flow between the brush holder B and the inner surface of the housing 2. Instead, the cooling air can flow only through the limited air channel S2 formed between the brush holder B and the commutator 11a. Thus, as the fan 11c rotates, the air may enter the housing 2 from its rear end, and almost all of the air flows through the air channel S2 at a high flow rate, thereby providing efficient cooling.

Further, the electric wires 21a may extend forwardly of the corresponding brush supports 21 and may further extend downward along the front surface of the brush holder B or the front surfaces of the holder halves 20R and 20L. Therefore, a space for wiring is not required on the rear side of the brush holder B. As a result, the entire impact driver 1 may have a length that is shorter than known impact drivers.

Furthermore, the right side holder half 20R and the left side holder half 20L can be used also as a left side holder half and a right side holder half, respectively. Therefore, the manufacturing cost of the holder halves can be reduced. In addition, the assembling operation of the brush holder can be simplified.

The above representative embodiment of the impact tool can be modified in various ways. For example, although the housing 2 and the brush holder B are divided into the right and left segments, respectively, they may be divided into upper and lower segments. In addition, although the mating planes or the dividing planes of the housing 2 and the brush holder B extend within a rotor plane that includes an axis of the rotor shaft 10a, the dividing planes may extend in a different plane than the rotor plane. For example, the dividing planes may extend obliquely relative to the rotor plane.

In this connection, although the holder halves 20R and 20L are identical in configuration with each other, they may have different configurations. For example, the brush holder may be divided by a different ratio, such as 6:4 than 1:1. Of course, such a ratio may be chosen in response to the dividing position of the housing. If the brush holder has been divided by such a different ratio, the divided holder halves are no longer interchangeable. In other words, they cannot be used as common parts. However, in the other respect, the operation and the advantages of this modified brush holder are the same as the above representative embodiment, because the assembling operation of the brush holder can be made separately from the assembling operation of the other motor parts.

In addition, although in the above representative embodiment, the mating surface of the housing halves 2R and 2L and the mating surface of the brush holder halves 2R and 2L extend within the same plane, they may extend in different planes from each other. For example, they may be displaced angularity in the rotational direction of the rotor 11 from each other by a little angle.

Further, the housing as well as the brush holder may be divided into three or more segments in the circumferential direction of the rotor shaft. In such a case, brush supports may be mounted on two of the brush holder segments that oppose to each other in the assembled state.

Although the above representative embodiment has been described in connection with the impact driver 1, the present invention can also be applied to the other kind of power tools, such as power hammer drills having either DC or AC electric motors.

What is claimed is:

1. A power tool comprising:
    a housing comprising a plurality of housing segments,
    a motor disposed within the housing and comprising a rotor,
    a stator and at least first and second brushes and
    a brush holder disposed within the housing, the brush holder comprising at least first and second separable holder segments, wherein the first holder segment supports the first brush and the second holder segment supports the second brush and the housing segments and the holder segments are circumferentially disposed about the motor, wherein the rotor has a rotor shaft on which a commutator and an armature coil are mounted, and wherein each of the at least first and second holder segments has a front surface that opposes the armature coil in the axial direction of the rotor shaft,
    a guide means is adapted to guide the electric line from the corresponding brush in a direction radially and outwardly with respect to the rotor shaft along the front surface of the corresponding holder segment, wherein the guide means includes a plurality of projections that extend forwardly of the front surface of each holder segment so as to form a guide path for the electric line between the projections, and wherein the rotor further includes a fan mounted on the rotor shaft on the rear side of the armature coil, and wherein the housing includes a buffer plate that is disposed on the rear side of the fan, the buffer plate being adapted to control a flow of air produced by the fan within the housing, and wherein each of the projections has a front end that is adapted to contact the buffer plate, so that the electric line extends through and between the corresponding holder segment and the buffer plate along the projections.

2. A power tool as in claim 1, wherein the circumferential direction of the motor is also the circumferential direction of the rotor.

3. A power tool as in claim 1, wherein the number of the holder segments equals the number of the housing segments.

4. A power tool as in claim 3, wherein each of the holder segments extends over an angular range that is the same as the angular range of the corresponding housing segment that opposes the holder segment in the radial direction of the rotor.

5. A power tool as in claim 4, wherein the holder segments each have the same configuration.

6. A power tool as in claim 3, wherein two housing segments and two holder segments are provided and each of the holder segments comprises a brush support member.

7. A power tool as in claim 6, wherein each of the housing segments and each of the holder segments extend over an angular range of about 180° in the circumferential direction.

8. A power tool as in claim 7, wherein each of the housing segments and each of the holder segments have opposite ends in the circumferential direction, and wherein the housing segments are adapted to be joined to each other at their opposite ends, so that the joined opposite ends of the housing segments are positioned within a first joining plane, and wherein the holder segments are adapted to be joined to each other at their opposite ends, so that the joined opposite ends of the holder segments are positioned within a second joining plane, and wherein the first joining plane and the second joining plane extend within substantially the same plane when the brush holder has been assembled into the motor housing.

9. A power tool as in claim 8, wherein the holder segments have the same configuration and are adapted to be positioned in a point symmetrical manner with each other with respect to the rotational axis of the rotor in the assembled state into the motor housing.

10. A power tool as in claim 6, wherein each of the holder segments includes a guide means that is adapted to guide an electric line along a predetermined path that extends from the corresponding brush.

11. A power tool comprising:
    a housing comprising at least first and second housing segments,
    a motor disposed within the housing, the motor comprising a rotor, a stator and at least first and second brushes and
    at least first and second brush holder segments, wherein the first brush is mounted on the first brush holder segment and the second brush is mounted on the second brush holder segment, the first brush holder segment is fastened to the second brush holder segment, thereby defining a brush holder disposed around the motor and the brush holder segments are disposed within the housing segments, and wherein the rotor includes a commutator mounted on a rotor shaft and an armature coil mounted on the rotor shaft, the first and second brush holder segments each include a front surface that opposes the armature coil in the axial direction of the rotor shaft,
    a guide means guides the electric wire away from the first brush along the front surface of the first brush holder segment in a direction radially and outwardly with respect to the rotor shaft, wherein the guide means includes a plurality of projections that extend forwardly of the front surface of the first brush holder segment, wherein a guide path for the electric wire is defined between the plurality of projections, and wherein the rotor further includes a fan mounted on the rotor shaft on the rear side of the armature coil, the housing further includes a buffer plate that is disposed on the rear side of the fan, the buffer plate controlling a flow of air produced by the fan within the housing, and wherein a front end of each of the projections contacts the buffer plate, and the electric wire extends through and between the first brush holder segment and the buffer plate along the projections.

12. A power tool as in claim 11, wherein the first brush holder segment extends over the same angular range as the first housing segment with respect to the radial direction of the rotor.

13. A power tool as in claim 11, wherein the first brush holder segment has the same configuration as the second brush holder segment.

14. A power tool as in claim 11, wherein each of the housing segments and each of the brush holder segments extend over an angular range of about 180° in the circumferential direction.

15. A power tool as in claim 11, wherein the first housing segment is arranged and constructed to mate with the second housing segment, and joining portions of the first and second housing segments are positioned within a first plane, and the first brush holder segment is arranged and constructed to mate with the second brush holder segment, and joining portions of the first and second brush holder segments are also positioned within the first plane when the brush holder segments are disposed within the assembled housing.

16. A power tool as in claim 15, wherein the first brush holder segment has the same configuration as the second brush holder segment and the first brush holder segment is disposed in a point symmetrical manner about a rotational axis of the rotor with respect to the second brush holder segment.

17. A power tool as in claim 11, wherein the first brush holder segment includes means for guiding an electric wire away from the first brush.

* * * * *